UNITED STATES PATENT OFFICE.

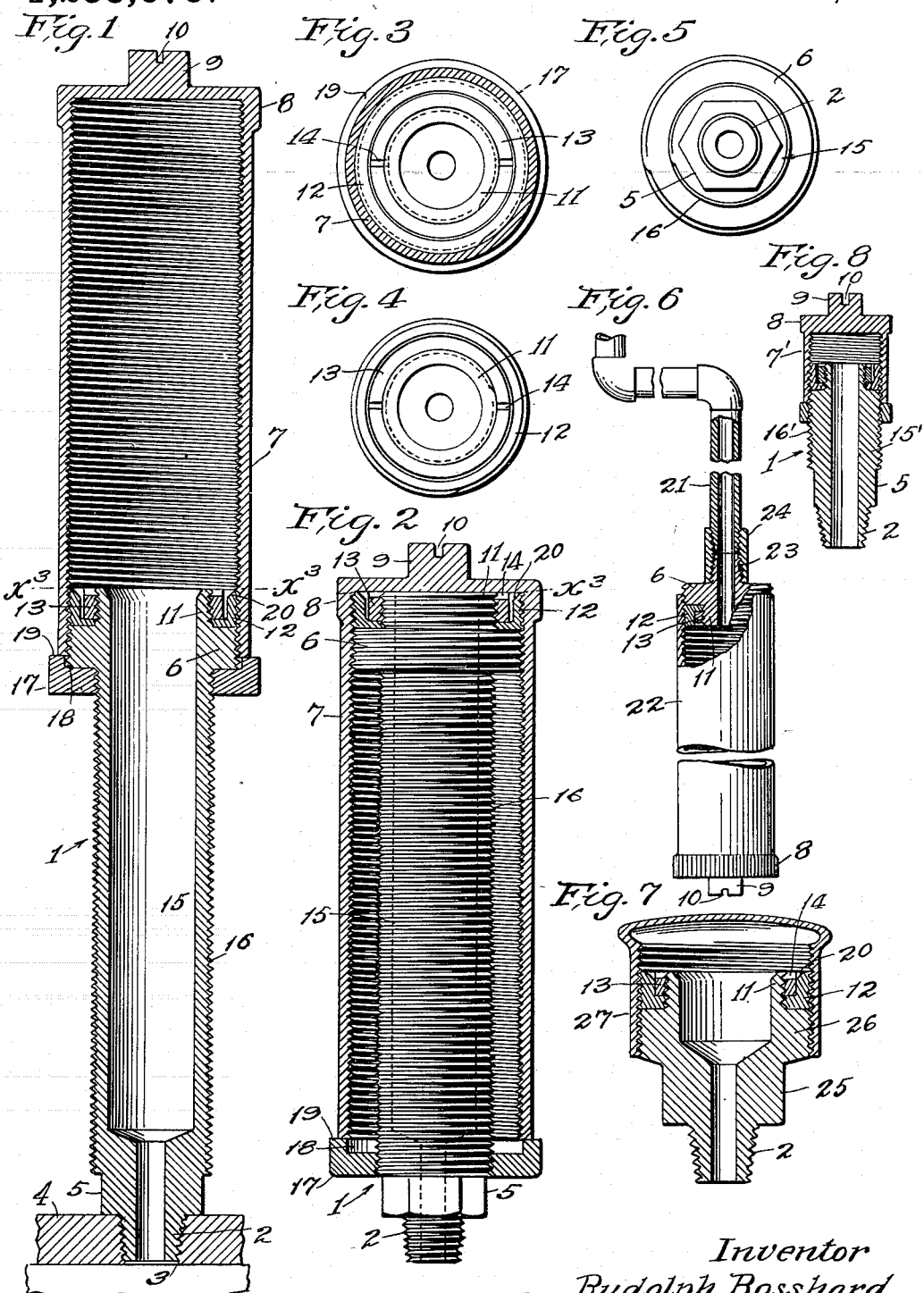

RUDOLPH BOSSHARD, OF MOUNT WILSON SOLAR OBSERVATORY, CALIFORNIA.

PRESSURE GREASE-CUP.

1,255,075.     Specification of Letters Patent.     Patented Jan. 29, 1918.

Application filed June 18, 1917. Serial No. 175,540.

*To all whom it may concern:*

Be it known that I, RUDOLPH BOSSHARD, a citizen of the United States, residing at Mount Wilson Solar Observatory, in the county of Los Angeles and State of California, have invented a new and useful Pressure Grease-Cup, of which the following is a specification.

The object of this invention is to provide a cheap, simple non-leaking force feed grease cup, of few parts, which is adapted to feed hard or soft grease, vaseline, or any heavy oil or grease that is of such consistency as to require pressure feeding.

An object is to provide a grease cup of the character above set forth by means of which the grease may be forced long distances to great heights and through tortuous passages without leaking at the cup.

The invention is adapted for constructions of different capacities so that the frequency of charging the cup may be minimized, where that is desired, by simply constructing the appliance of a required length.

An object is to make provision whereby adjustment or increase of pressure to express the grease from time to time as required, can be made by hand and without wrench, screw driver or other tool, although a tool may be employed.

Other objects, advantages and features of invention may appear from the accompanying drawings, the subjoined detail description and the appended claims.

The accompanying drawings illustrate the invention.

Figure 1 is an axial section of an elongate grease cup embodying this invention and mounted on a bearing, a fragment of which is shown, the cap being just screwed onto its seat and being secured by a jam-nut.

Fig. 2 is an axial section of the grease cup shown in Fig. 1, the cup having been fully screwed home and again secured by the jam-nut.

Fig. 3 is a plan section on line $x^3$, Figs. 1 and 2, with the plunger cup and the jam-nut securing the cup in place.

Fig. 4 is a top plan of the standard with plunger cup in place.

Fig. 5 is a bottom plan of the standard.

Fig. 6 is an elevation of an elongate grease cup of a different form, portions of the cap being broken away to expose interior construction.

Fig. 7 is an axial section of a short grease cup.

Fig. 8 is an axial section of another form more particularly adapted to small size grease cups.

The tubular body or standard 1 terminates at its lower end in a threaded nipple 2, adapted to be screwed into the socket 3 of the bearing 4 or other part to be lubricated. Said standard is provided above said nipple with a wrench-seat 5, which may be hexagonal or of any other external form adapted to receive the tool by which the grease cup is to be turned for firmly seating the same in the bearing. Said standard is provided above the wrench-seat with a plunger-head 6 externally threaded to form a cap-seat, upon which is secured a hollow internally threaded grease cap 7, open at one end and closed at the other end, and there provided with a wrench-seat which may be hexagonal, or other desired form and is shown at 8 as a milled rim for convenience of turning by hand. Said cap is also shown as being provided with a wrench boss 9 having a screw-driver slot 10, so that the cap may be turned by hand, by wrench, or by screw driver, as may be most convenient.

The standard 1 is provided above the threaded cap-seat forming plunger-head 6 with an externally threaded nipple 11 of less diameter than the cap seat to receive the plunger cup formed by a leather cup 12 held by the internally threaded jam-nut 13; which jam-nut is provided with screw driver or spanner wrench slots 14.

The depth of the internally threaded grease cap 7 is greater than the length of the threaded cap-seat of the plunger-head 6 and plunger-cup 12 so that the cap may fully receive and accommodate the cap-seat and plunger-cup, thus allowing the plunger head and plunger-cup to practically close the space between it and the top of the cavity in said cap.

In the form shown in Figs. 1 and 2, the standard is provided with a shank 15 between the wrench-seat 5 and the cap-seat of plunger-head 6 to accommodate the lower portion of the cap when it is fully screwed home, and the charge of grease has been expressed. The shank 15 is preferably provided with external threads 16 upon which a milled jam-nut 17 is screwed so that when it is desired to lock the cap after it has been screwed onto the cap-seat, this may be done by screwing the jam-nut up against the lower end of the cap; and when it is desired to further express grease, the jam-nut may be loosened by hand, the cap screwed down and the jam-nut screwed back to engage the cap.

In the form shown in Fig. 8, the shank 15' forms the cap seat, and the cap screws thereonto.

The jam-nut as shown is provided with a recess 18 to accommodate a portion of the cap seat, thus to allow the rim 19 of the jam-nut to jam against the cap before the grease-cup has been screwed down beyond the grease-cap seat.

The plunger-cup 12 is made of leather, rubber or other yielding material that is suitable for sucker or plunger-cups of pumps or the like and is of an external diameter adapted to be threaded into the cap when the cap is screwed home on the cup and the cap-seat.

The plunger-cup may be secured to the upper end of the cap-seat by any suitable means, but it is preferred to secure the same in the manner shown by the threaded plunger-cup nipple 11 and the plunger-cup jam-nut 13 screwed thereonto. The rim of the plunger-cup is shown internally chamfered as at 20 in order to allow free passage of the grease into the annular space between the jam-nut and the expansible annular wall of the plunger-cup to expand the plunger-cup to make it fit the threads of the cap when the cap is screwed home thereon.

In the form shown in Fig. 6 the tubular shank 21 is a pipe to make a shank of minimized diameter. It is externally smooth and is adapted to allow the cap 22 to be of an elongate character, indefinite in length to accommodate a large number of adjustments and to supply at one charge enough grease to fill a pipe extending a great distance. The long pipe 21 is connected to a nipple 23 on cap seat of plunger cup 6' by a coupling 24, and is adapted by elbows *a* to be led zigzag around obstructions to a distant bearing not shown.

In the form shown in Fig. 7 the wrench-seat 25 and the cap-seat 26 are juxtaposed, and the depth of the cap 27 is somewhat less than the combined lengths of the cap-seat and wrench-seat so that when the cap is screwed entirely home it will accommodate the cap-seat and a portion of the wrench-seat, leaving some of the wrench-seat out, so as to be available to receive a wrench.

I claim:

1. A pressure grease cup provided with a plunger head externally threaded to form a cap-seat; said grease cup being provided above the plunger head with a nipple, a plunger packing cup mounted on the nipple above the cap seat and adapted to be threaded into a grease cup, means on the nipple to hold the plunger packing cup in place and a hollow internally threaded grease cap screwed onto the cap seat; the plunger packing cup contacting with the interior of the cap.

2. A pressure grease cup comprising a tubular body, a plunger head externally threaded to form a cap seat on said body, an externally threaded nipple above said plunger head, a hollow grease cap screwed onto the cap seat, a yielding plunger packing cup on the nipple, a jam-nut on the nipple to hold the plunger packing cup in place and a hollow grease cap screwed onto the plunger packing cup and the cap seat.

3. A pressure grease cup comprising a nipple, a wrench seat above the nipple, a shank above the wrench seat, a plunger head externally threaded to form a cap seat above the shank, a nipple above the plunger head, an internally threaded cap adapted to screw onto the cap seat and to accommodate the shank, and a yielding plunger packing cup secured to the nipple and threaded into the shank.

4. A pressure grease cup comprising a nipple, a wrench seat above the nipple, an externally threaded shank of larger diameter than the wrench seat, a plunger head externally threaded to form a grease cap seat above the shank, a nipple above the plunger head, an internally threaded grease cap adapted to screw onto the grease cap seat and to accommodate the shank, a plunger packing cup secured to the nipple and threaded into the grease cap, and a jam-nut screwed onto the externally threaded shank and against the end of the grease cap.

5. A pressure grease cup comprising a nipple, a wrench seat above the nipple, an externally threaded shank of larger diameter than the wrench seat, a plunger head externally threaded to form a grease cap seat above the shank, a nipple above the plunger head, an internally threaded grease cap adapted to screw onto the cap seat and to accommodate the shank, a plunger packing cup secured to the nipple and threaded onto the grease cap, and a jam-nut screwed onto the externally threaded shank and against the end of the grease cap, said jam-nut being chambered to accommodate the grease cap seat and provided with a rim to jam against the lower end of the grease cap.

In testimony whereof, I have hereunto set my hand at Los Angeles, California, this 8th day of June, 1917.

RUDOLPH BOSSHARD.

Witness:
 JAMES R. TOWNSEND.